United States Patent Office 3,672,945
Patented June 27, 1972

3,672,945
GRANULES COMPRISING INERT CORES COATED WITH AN ABSORBENT POWDER
Geoffrey Gordon Taylor, Nelson, New Zealand, assignor to Fruitgrowers Chemical Company Limited, Port Mapua, Nelson, New Zealand
No Drawing. Filed Oct. 17, 1969, Ser. No. 867,401
Claims priority, application New Zealand, Oct. 18, 1968, 154,193
Int. Cl. B44d *1/094*
U.S. Cl. 117—100 B          7 Claims

ABSTRACT OF THE DISCLOSURE

Granules are made by coating solid inert cores with an adhesive acting as the agent to bond the powder to the cores. The granules can thus now absorb agricultural chemicals, such as fungicides, micro-organisms, fertilizers, insecticides and herbicides, and constitute a readily controllable means for the application of such substances to the land or other desired locus.

---

This invention relates to improved granules having an absorbent coating which absorbs agricultural chemicals for release on application to the desired locus.

The term "Agricultural Chemical(s)" as used in the specification is meant any material(s) having an important influence on biological processes. In particular, the term includes fertilizers, micro-organisms, fungicides, insecticides (and other pest control chemicals) herbicides, trace elements and the like.

In recent years the application of agricultural chemicals to soil areas have been performed by absorbing the agricultural chemicals in porous granular materials, and applying these granular materials incorporating the agricultural chemical to the soil area. Such granules generally having a size within the range of from 10–60 mesh are not subjected to drift by winds on to adjacent areas as in the case of agricultural chemicals when applied in form of dusts and sprays.

In New Zealand patent specification No. 105,573/106,878 and Canadian patent specification No. 589,926 there is described a granule comprising a solid inert core with the agricultural chemical bonded to the inert core by means of an adhesive. Such agricultural chemical was bonded to the inert core in a discontinuous state. There are many agricultural chemicals now available in liquid form for example diazinon, fenitrothion, VC-13.

The processes described in the above mentioned patent specifications are concerned with materials in liquid form which have first to be reduced to the discontinuous state, in the form of a wettable powder or dust, and subsequently mixed with the diluent and adhesive and then bonded to the core. In such discontinuous state, especially if the particles are extremely small the material is difficult to confine, and where the agricultural chemical is dangerous a system must be adopted to avoid contamination of the building itself, its environment and the workers. Such a plant is very expensive.

It has been further proposed as in New Zealand specification No. 105,756 and New Zealand specification No. 137,572/138,857 (patent of addition to 105,756) to use a granule composed of a complete porous material, such as pumice or preformed attapulgite. Such granules have low densities and therefore inherently poor ballistics for spreading and placement compared with a granule having a dense inert core. They also have absorbency of such a high order that the weight of granules which contains a sufficient number to give an adequate spread of granules per unit area will absorb much more of the agricultural chemical than is needed for that same area. The consequence is that if the absorbency of some of the granules in this weight is fully satisfied, it is only because that in others it is under satisfied. Thus each granule may carry a different weight of the agricultural chemical.

It is thus an object of this invention to provide a granule which, in manufacture, can be prepared with a known absorbency and which can be prepared with a dense inert core and wherein the agricultural chemical can be applied to the granule in the continuous state.

According to this invention there is provided a granule for incorporation of and use in the dispersion of an agricultural chemical comprising a solid inert core coated with a finely divided absorbent powder which is bonded to the solid inert core with an inert adhesive.

Further according to this invention there is provided a process for the preparation of granules for incorporation of and use in the dispersion of an agricultural chemical comprising preparing solid inert cores in the desired size range, adding an adhesive to the solid cores to form a mixture and feeding a finely divided absorbent powder material into the mixture thereby coating the solid cores with the finely divided absorbent powder and adhesive.

The solid core used in the preparation of the granule according to this invention is any solid particle which can be used as a carrier particle or nucleus for the finely divided absorbent powder coating even though such particles may have a useful purpose in their own right but are preferably inert. The physical and chemical characteristics of the solid core are selected according to the desired final usage of the granules. Suitable materials for preparing the inert core include solid fungicides, solid insecticides, solid fertilisers or other useful matreials as agricultural chemicals, nut shells such as walnut shells, solid mineral substances such as sand, calcite, dolomite. Such materials must be inert to the agricultural chemicals applied to the finely divided absorbent powder coating i.e. they do not tend to cause the deterioration of the efficiency of the agricultural chemical applied to the absorbent coating. Synthetic materials such as urea or natural organic products such as sugar or starch can also be used. Preferably the solid cores are not absorbent.

Finely divided absorbent powders used in accordance with this invention are powders which absorb agricultural chemicals (when in a continuous state) and, the powders must be inert to the absorbed agricultural chemical. Such powders include finely ground mineral substances such as absorbent clays, e.g. attapulgite, pumice, zeolite, diatomite, and modified diatomaceous materials such as Microcel E and finely ground organic substances such as peat, wood powder, and combinations of finely ground mineral substances and/or finely ground organic substances.

The adhesive used in accordance with this invention is preferably a water soluble adhesive in order that the adhesive bond between the finely-divided absorbent powder containing the agricultural chemical and the solid core is dissolved when the granules are applied to the soil surface. The solubility of the adhesive in water can be high in order to obtain a rapid release of the agricultural chemicals absorbed in the finely divided absorbent powder or the solubility can be low in order to obtain a slow release of the agricultural chemical. The adhesive shall also be chosen to conform with the requirements of the agricultural chemical to be applied to the granule, i.e. the agricultural chemical in its continuous state will not solubilise the adhesive of the granule. Furthermore the adhesive must be inert to the agricultural chemicals incorporated in the sorbent coating. The type of adhesive is also determined according to the nature of the solid core. For example, if a water soluble core is used e.g.

sugar, an adhesive which will not dissolve the core is used. Suitable water soluble adhesives which generally satisfy the above requirements are those such as carboxymethylcellulose, alginates, molasses, sulphite-lye, gum arabic. Molasses has been found to be an inexpensive and efficient adhesive. Other properties of the adhesive are adjusted to suit various embodiments of which some will be described herein.

The agricultural chemicals applied to the granules are in the continuous state, such as solutions in water or non-aqueous solvents or as liquids in their own right. These can be modified by admixture of two or more different kinds of agricultural chemicals also the addition of wetting agents, such as emulsifiers and stabilisers.

The granules made according to this invention can vary in size depending on the particular requirements. The size of the particles are determined primarily in the minimum by the ability to rebound off foliage and as a consequence fall through to a soil surface, and in the maximum by the dilution of the agricultural chemical caused by the increasing size of the granule. It has been found that granules having a particle size within the mesh range of 8-72 mesh BSS preferably 20-60 mesh BSS meet these requirements particularly for aerial distribution, but on some particular situations, a granule having a larger or smaller particle size, may be preferred, and this invention provides for particles of any desired size.

In the preferred form of this invention the solid core is prepared as passing a 20 mesh BSS and being retained on a 60 mesh BSS, passing the prepared solid cores to a suitable blender, adding the adhesive to form a mixture within the blender and feeding the finely divided absorbent powder into the mixture to form an absorbent coating on the solid cores. The finely divided absorbent powder in this preferred form of the invention is preferably of a particle size passing a 150 mesh BSS, more preferred being particles having a minimum of 95% passing a 300 mesh BSS.

The finely divided absorbent powder material is preferably first intimately mixed with water or a non-aqueous liquid before application of the powder to the mixture of solid core and adhesive. In this way the sorbency of the finely divided absorbent powder is satisfied and thus will not tend to absorb any of the adhesive, and the amount of adhesive required is reduced to a minimum. After adding the damp absorbent powder to the mixture and causing formation of absorbent granules, the granules are then dried to remove the water or non-aqueous liquid from the absorbent coating to return to the original sorbency of the absorbent coating. If a non-aqueous liquid is used then a system of liquid recovery of the liquid is preferably incorporated in the drying apparatus.

The quantity of adhesive used depends on the quantity of powder to be applied to the solid core. The maximum quantity of powder which can be effectively applied depends partly on the nature of the powder, partly on the method of application of the powder to the adhesive coated solid core and partly on the density of the solid core.

Thus the granules according to this invention are preformed with an absorbent coat, and each granule produced in each batch will generally have a uniform amount of absorbent powder on each granule. Each absorbent powder used in this invention has either a known water absorbency or this can be readily determined by trial. Similarly their absorbency in respect of various agricultural chemicals can be determined by trial. Thus the absorbent granules generally provide a consistent ratio of weight of core to weight of agricultural chemical. Thus when the agricultural chemical is applied to such granules in the quantity calculated to fully satisfy the absorbency of the weight of granules concerned, it is consistently found that the percentage by weight of agricultural chemicals carried by each granule is in the same order.

Thus the granules according to this invention allow a selected weight of agricultural chemicals to be absorbed uniformly amongst a selected weight of granule. Consequently when this weight of granules is applied to a selected area, the dose rate of the agricultural chemical per unit area of that chemical selected is uniform.

To the granules there may also be applied water soluble dyes of any required colour in order to distinguish different types of granule. Dyes soluble in the agricultural chemical in its continuous state may also be employed.

The granules according to this invention may be prepared by the following production method.

(1) A ribbon blender of conventional design and of required capacity is equipped with spray nozzles. The finely divided absorbent powder is first blended and then sprayed with water to produce a damp powder. Dye materials, wetting or other modifying agents may be added at this stage to the water.

(2) The damp dust from the blender is passed through a hammer mill and then packed off in weighed amounts in polythene bags.

(3) A ribbon blender of modified design is used to enable the ribbons to be locked in place and the drum and ribbons to be rotated as a single unit. One convenient size is a drum of 2' in diameter and 4' in length which can be driven both clockwise and counter clockwise at a speed of about 27 r.p.m. A hinged lid is provided for filling and emptying.

(a) The required charge of solid core material is placed in the blender and adhesive solution poured or pumped in through a hose.
(b) The ribbons only are operated for a short period in both directions until the adhesive solution is evenly distributed through the mass of core material.
(c) The damp absorbent powder is then added and with the ribbons locked the whole drum rotated for a few minutes in both directions. With the drum stationary, the ribbons are then operated for a few revolutions to clear the walls of the drum. The drum, with ribbons locked, is then again rotated until all the damp absorbent powder is coated on the core material.

(4) Equipment for drying may be a rotary drum dryer moving band or fluid bed. A rotating drum provided with lifting flights has been found convenient. Heat is drawn from an electric or oil fired heat exchanger through a distribution manifold in the drum and is vented to atmosphere through dust socks. The core material coated with absorbent powder is dried at a product temperature which rises to about 140° F. and is completed within 1½ hours when moisture content is at a maximum of 0.5%.

(5) The dried absorbent granules are screened to remove any over size or loose dust and are then packed off in weighed amounts in polythene lined bags and stored ready for the next step of the addition of the agricultural chemical in its continuous state.

(6) Any type or size of rotating drum open or closed may be used when applying the agricultural chemical. Provision is made for pouring the agricultural chemical directly on to the absorbent granules from a measure for small amounts in an open container such as a concrete mixer, or as a coarse spray from a metering pump or other dispensing unit where granules are held in an enclosed drum. The drum is charged with the required amount of the initially prepared absorbent granules from (5) above and an appropriate quantity of the agricultural chemical is poured or sprayed in. Rotation of the wet mass of absorbent granules is continued until all the agricultural chemical is taken up by the absorbent coat and the products becomes free flowing.

(7) The finished product is screened to remove any oversize and packed off.

The absorbent granules are formulated as determined by the physical nature and active chemical content of the agricultural chemical to be used. The objective is to produce an absorbent granule which takes up the required quantity of agricultural chemical, in its continuous state, slowly, thereby allowing sufficient time for even distribution throughout the mass of granules, but which has sufficient sorbency to ensure that within a few minutes any excess liquid is completely absorbed and the granules become free flowing. There are several variables which can be adjusted to achieve these objectives:

(i) The nature of the absorbent powder mixture. Use of Microcel E increases sorbency but when used alone gives rise to difficulties of producing a stable absorbent granule. Addition of clay, pumicite, and diatomite, in varying proportions improves stability and serves to adjust sorbency to required levels.

(ii) The proportion of water added to the absorbent powder. It is necessary to satisfy most of the absorbent capacity of the powder by addition of water to enable effective coating of the core material. The least amount of water is used to reduce cost of drying. If water is increased loss of sorbency occurs through excess compaction of the coat.

(iii) The quantity of the adhesive used on the core material. This has to be sufficient to produce a stable core but not an excess which causes undue compaction of the coat and leads to loss of sorbency.

(iv) The weight of absorbent powder to core material. The sorbency of the granules can be adjusted to greater or lesser amount according to the proportion of powder used. There is however an upper limit beyond which the granule becomes unstable and powder is lost in the course of coating and drying.

(v) Consolidation of the absorbent coat in the course of drying. Prolongation of the time of drying in a rotary dryer reduces sorbency of the dry product. Temperature of drying air can be high in the initial stages. Under normal conditions drying should be completed within 1½ hours. Product temperature can be allowed to rise to 200 degrees F. One practical temperature has been found to be 140° F. when percent moisture is reduced to below 0.5%. Improved sorbency of up to 50% can be obtained by passing through or over a static bed such as used in a band dryer or high pressure air may be used ot achieve fluidisation such as in a fluid bed or by drying in a rotary kiln.

(vi) The physical nature of the agricultural chemical. The percentage of active chemical which can be taken up depends on the density of the agricultural chemical, on the active content of the technical chemical and on the use of additives. If sorbency of the absorbent granule is in excess then distribution may be uneven with some of the granules carrying reduced amounts and others carrying excess amounts of active chemical. This can be corrected by dilution of the agricultural chemical with a suitable liquid but the preferred method is to adjust the absorbent character of the granule itself at time of manufacture.

The granules according to this invention may be produced by another method known as panning whereby powder and sprayed adhesive are continuously applied to the solid cores by which method large quantities of powder can be applied to the core.

Agricultural chemicals such as herbicides, insecticides, and fungicides can be readily incorporated within the absorbent coat when the agricultural chemical is in a continuous state. When it is desired to incorporate micro-organisms such as Rhizobia within the absorbent coat of the granule then it is desirable to convert the micro-organism from its inert state when freeze dried or such like into a suitable continuous and viable state. Thus the micro-organism may be incorporated in a nutrient broth and this nutrient broth containing the micro-organism can then be applied to the absorbent granule. The absorbent coat will preferably be of such a type to support the micro-organism in a viable state and, where conditions require, to provide a medium within which the organism can multiply. Nutrient materials may be added to the absorbent coat to support the growth of the micro-organism and also other chemicals may be added to the absorbent coat to protect the micro-organism against other effects such as that of ultra violet light.

The adhesive bound absorbent coat according to this invention can be provided such that the coat containing the agricultural chemicals will rapidly disperse and release the agricultural chemicals in the presence of water or where the desired use of the chemical requires a slower rate of release of the agricultural chemical to the soil area, then the adhesive will be such that it will be resistant to the effects of water and the absorbent coat will release the absorbed chemicals slowly by leaching or by volatilisation.

In a further aspect of this invention the solid cores can be mixed with an initially water soluble adhesive compound of such a type that after addition of the absorbent powder material and formation of granules, on removal of the water, the water soluble compound becomes insoluble in water.

In a further aspect of the invention the inert cores can be mixed with a water soluble or solvent soluble adhesive of such a type that after addition of the absorbent powder and formation of granules, the further addition by spraying of an agent or additive causes the water or solvent soluble adhesive to react chemically to form a water or solvent insoluble adhesive.

The rate of release of the agricultural chemical may also be decreased by raising the temperature of the absorbent granules in the course of drying to render the adhesive insoluble in water.

In a further aspect of this invention there can be added a chemical which adjusts the pH of the absorbent coat to suit the agricultural chemical to be applied which chemical will be inert to the agricultural chemical, or to provide a suitable pH medium for the micro-organism.

After dispersing the agricultural chemical into the absorbent coat of the granule and separation of the granules as free flowing it is desirable to add a lubricant such as talc to the granules to improve the free flowing properties of the granules and thus improve the rate and area of distribution of the granules in application by any suitable means.

Furthermore, various other formulations can be added in small amounts as trace elements to assist in biological function.

The following non-limitative examples are given by way of explanation. Percentages are given by weight.

EXAMPLE 1

To produce a sorbent granule and from it to formulate a product containing 10 percent parathion.

(1) Prepare damp sorbent powder to the following formula by Production Methods 1 and 2.

| | Percent |
|---|---|
| Microcel E | 32 |
| China clay | 13 |
| Water | 54 |

(2) Coat solid core material with damp dust by Production Method 3, steps (a) to (c).

(a) Charge the blender with 270 lb. calcite granules of particle size range of 22 to 36 mesh BSS and pour or pump in 10.2 lb. of 60 percent molasses solution.
(b) Operate the blender ribbons for up to 30 seconds in each direction.
(c) Add 64 lb. of damp sorbent dust and with ribbons locked rotate blender for five minutes in each direction. Operate ribbons only for two to three revolutions in each direction, examine the product and, as necessary, continue rolling until all the damp dust is coated on the solid core material.

(3) Transfer two charges as formed in (2) above to the rotary dryer as in Production Method 4. Using air with heat input equivalent to about 30 kw. with an air flow of approximately 300 c.f.m. continue drying until product temperature rises to about 140° F. and water content is less than 0.5 percent.

(4) Transfer dry sorbent granules to the rotating drum as in Production Method 6 and apply 11.3 lb. of 99 percent technical parathion to each 100 lb. of dry sorbent granules. Continue rotating the drum until the granules are free flowing and ready for final screening and packaging.

EXAMPLE 2

To produce a sorbent granule and from it to formulate a production containing 15 percent fenitrothion.

(1) Prepare damp sorbent powder to the following formula by Production Methods 1 and 2.

|  | Percent |
|---|---|
| Microcel E | 13 |
| Diatomite | 38 |
| China clay | 11 |
| Water | 18 |

(2) Coat solid core material with damp dust by Production Method 3, steps (a) to (c). Use calcite solid core material in the size range 22 to 36 mesh BSS. Apply 21 lb. of 60 percent molasses to each 270 lb. of solid core material. Proceed as in previous example applying 120 lb. damp dust to each 270 lb. of solid core material.

(3) Dry the damp granules without rolling by any conventional method such as a band or fluid bed dryer to a water content of less than 0.5 percent.

(4) Apply fenitrothion by Production Method 6 at a rate of 18.1 lb. of 98 percent technical fenitrothion to each 100 lbs. of dry sorbent granules. Continue rotating until granules are free flowing and pack off.

EXAMPLE 3

To produce a sorbent granule and from it to formulate a product containing 5 percent fensulfothion.

(1) Prepare damp sorbent powder to following formula by Production Methods 1 and 2.

|  | Percent |
|---|---|
| Diatomite | 67 |
| China clay | 15 |
| Water | 18 |

(2) Coat solid core material with damp dust by Production Method 3, steps (a) to (c). Use calcite solid core material in the size range of 22 to 36 mesh BSS. Apply 5.5 lb. of a solution containing 60 percent molasses and 2 percent dye to each 305 lb. of solid core material. Proceed as in previous examples applying 32 lb. damp dust to each 305 lb. core material.

(3) Dry the damp sorbent granules as in Production Method 4 in Example 1.

(4) Apply fensulfothion by Production Method 6 at a rate of 5.7 lb. of 93 percent technical fensulfothion to each 100 lb. of sorbent granules. Continue rotating until granules are free flowing and pack off.

I claim:

1. A granule for use in the dispersion of an agricultural chemical comprising a solid inert core coated with a water-soluble adhesive layer and an external layer of finely divided absorbent powder bonded to said adhesive layer, said external layer of finely divided absorbent powder after being bonded to the core by said adhesive layer having absorbed thereon an agricultural chemical, said agricultural chemical being applied to the core coated with the absorbent powder from a continuous state.

2. A granule as claimed in claim 1 wherein the solid inert cores are non-absorbent.

3. A granule as claimed in claim 2 wherein the finely divided absorbent material is an absorbent clay, a modified diatomaceous material, or a finely ground organic substance.

4. A granule as defined in claim 1 wherein the adhesive is carboxymethyl cellulose, an alginate, molasses, sulphite-lye, or gum arabic.

5. A process for the preparation of granules for use in the dispersion of an agricultural chemical which comprises preparing solid inert cores in the desired size range, adding an inert adhesive to these solid cores to form a mixture, feeding a finely divided absorbent powder material into the mixture thereby coating the solid cores with the finely divided absorbent powder and applying to the coated cores an agricultural chemical in a continuous state whereby the agricultural chemical is absorbed by the finely divided absorbed powder to form free-flowing granules.

6. A process as in claim 5 wherein the finely divided absorbent powder is first intimately admixed with water or a non-aqueous liquid before feeding the powder to the mixture and wherein after coating the solid core with the damp, finely divided absorbent powder and adhesive, the so-formed granules are dried.

7. A process as in claim 5 further comprising, after incorporation of the agricultural chemicals, adding a lubricant to the granules.

References Cited

UNITED STATES PATENTS

| 3,192,031 | 6/1965 | Zaayenga | 71—64 X |
| 3,342,577 | 9/1967 | Blouin | 71—64 X |
| 3,576,613 | 4/1971 | Fleming | 71—64 X |
| 935,180 | 9/1909 | Williamson | 117—100 X |
| 2,698,815 | 1/1955 | Bishop | 117—100 |
| 2,733,160 | 1/1956 | Iler | 117—100 X |
| 2,871,774 | 2/1959 | Johnson | 117—33 X |
| 3,046,103 | 7/1962 | Barth | 117—100 X |
| 3,219,194 | 11/1965 | Schwartzwalder | 117—33 |
| 3,250,607 | 5/1966 | Sawyer | 117—100 X |
| 3,269,815 | 8/1966 | Koopman | 117—33 X |
| 3,418,151 | 12/1968 | Orthalek et al. | 117—100 X |
| 3,519,470 | 7/1970 | Gordon et al. | 117—84 X |
| 3,524,756 | 8/1970 | Signorino et al. | 117—91 X |

FOREIGN PATENTS

| 589,926 | 12/1959 | Canada | 117—100 |

WILLIAM D. MARTIN, Primary Examiner

M. R. P. PERRUNE, Jr., Assistant Examiner

U.S. Cl. X.R.

71—64E, 64F, 64G; 117—33, 84, 91, 100 A, 100 C, 100 M, 100 S